United States Patent
Sievers et al.

(10) Patent No.: US 11,673,193 B2
(45) Date of Patent: Jun. 13, 2023

(54) CONJOINED STEEL AND TITANIUM VIA ADDITIVE MANUFACTURE

(71) Applicant: The Boeing Company, Chicago, IL (US)

(72) Inventors: Daniel Elliott Sievers, Owens Cross Roads, AL (US); Eric Erwin Thomas, Saint Charles, MO (US)

(73) Assignee: THE BOEING COMPANY, Arlington, VA (US)

( * ) Notice: Subject to any disclaimer, the term of this patent is extended or adjusted under 35 U.S.C. 154(b) by 265 days.

(21) Appl. No.: 16/675,642

(22) Filed: Nov. 6, 2019

(65) Prior Publication Data
US 2021/0129222 A1    May 6, 2021

(51) Int. Cl.
*B22F 5/08*        (2006.01)
*B22F 10/00*     (2021.01)
(Continued)

(52) U.S. Cl.
CPC .............. *B22F 5/08* (2013.01); *B22F 10/00* (2021.01); *B22F 10/25* (2021.01); *B22F 10/28* (2021.01);
(Continued)

(58) Field of Classification Search
CPC .. B22F 10/00; B22F 5/08; B22F 10/10; B22F 2201/11; B22F 2301/205; B22F 2301/35; B33Y 10/00; B33Y 80/00
See application file for complete search history.

(56) References Cited

U.S. PATENT DOCUMENTS

| 2004/0170860 | A1 | 9/2004 | Hardwick et al. |
| 2004/0182835 | A1* | 9/2004 | Hall ............... B23K 26/211 219/121.64 |
| 2018/0161931 | A1* | 6/2018 | Li .................. B23K 26/342 |
| 2018/0272460 | A1* | 9/2018 | Nelson ............ B22F 12/45 |
| 2019/0011033 | A1 | 1/2019 | McCune |

FOREIGN PATENT DOCUMENTS

| KR | 101981625 B1 * | 9/2019 | ........... B23K 26/342 |
| KR | 101981625 B1 | 9/2019 | |

OTHER PUBLICATIONS

Reichardt et al. ("Development and characterization of Ti—6Al—4V to 304L stainless steel gradient components fabricated with laser deposition additive manufacturing." Materials & Design 104 (2016): 404-413.) (Year: 2016).*

(Continued)

*Primary Examiner* — Sally A Merkling
*Assistant Examiner* — Ricardo D Morales
(74) *Attorney, Agent, or Firm* — Alleman Hall Creasman & Tuttle LLP

(57) ABSTRACT

A process for additive manufacture of an article including conjoined first and second metals, wherein the first metal includes one of steel and titanium and the second metal includes another of the steel and the titanium. The process comprises arranging an interface layer of a third metal on a substrate of the first metal, wherein the third metal is capable of forming an alloy with the first metal and capable of forming an alloy with the second metal. The process further comprises supplying a consumable form of the second metal to a locus of the interface layer and heating the locus of the interface layer in an non-reactive environment. In this process, the heating fuses the consumable form of the second metal to render a fused form of the second metal and joins the fused form of the second metal to the interface layer.

26 Claims, 10 Drawing Sheets

(51) Int. Cl.
- *B22F 10/25* (2021.01)
- *B22F 10/28* (2021.01)
- *B22F 12/41* (2021.01)
- *B22F 10/32* (2021.01)
- *B22F 10/36* (2021.01)
- *B22F 10/64* (2021.01)
- *B33Y 10/00* (2015.01)
- *B33Y 80/00* (2015.01)
- *B22F 12/53* (2021.01)
- *B22F 10/38* (2021.01)

(52) U.S. Cl.
CPC .............. *B22F 10/32* (2021.01); *B22F 10/36* (2021.01); *B22F 10/64* (2021.01); *B22F 12/41* (2021.01); *B22F 10/38* (2021.01); *B22F 12/53* (2021.01); *B22F 2201/11* (2013.01); *B22F 2301/205* (2013.01); *B22F 2301/35* (2013.01); *B33Y 10/00* (2014.12); *B33Y 80/00* (2014.12)

(56) References Cited

OTHER PUBLICATIONS

Qiu et al. ("Fabrication of large Ti—6Al—4V structures by direct laser deposition." Journal of Alloys and Compounds 629 (2015): 351-361.). (Year: 2015).*

Gould, J et al., "Joining of Steel to Titanium with Interlayers," EWI, May 4, 2018, 2 pages.

Reichardt, A. et al., "Development and characterization of Ti—6Al—4V to 304L stainless steel gradient components fabricated with laser deposition additive manufacturing," Materials & Design, vol. 104, Aug. 15, 2016, 10 pages.

European Patent Office, Extended European Search Report Issued in Application No. 20205030.8, dated Mar. 2, 2021, Germany, 14 pages.

European Patent Office, Office action issued in EP Application No. 20205030.8, dated Feb. 7, 2023, 12 pages.

* cited by examiner

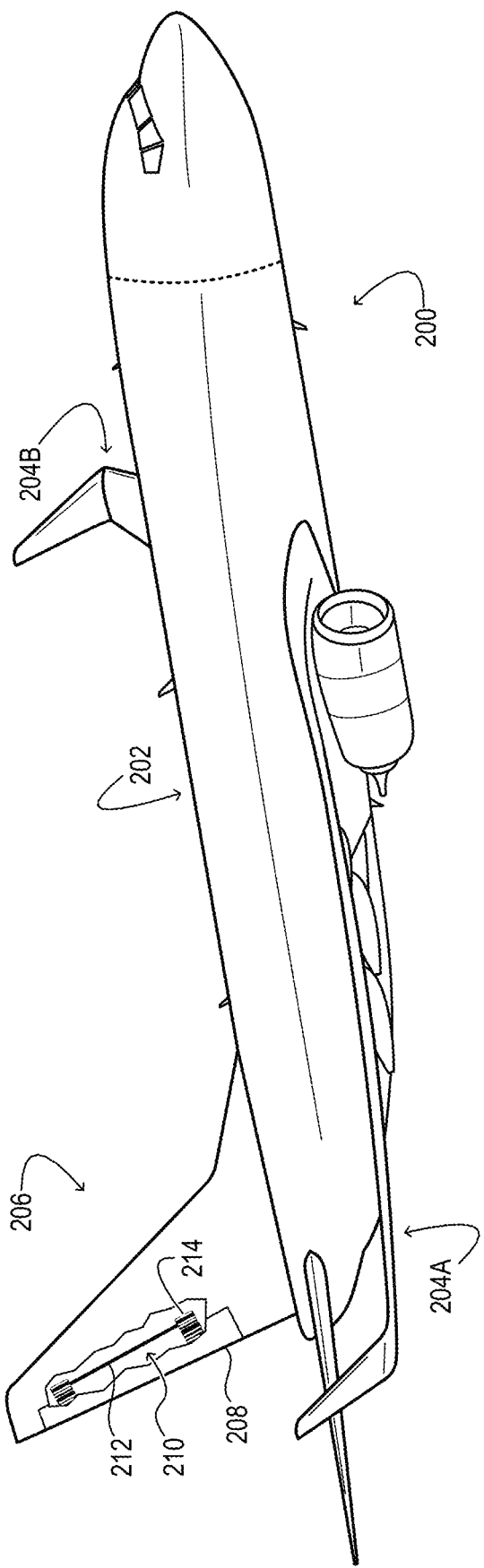
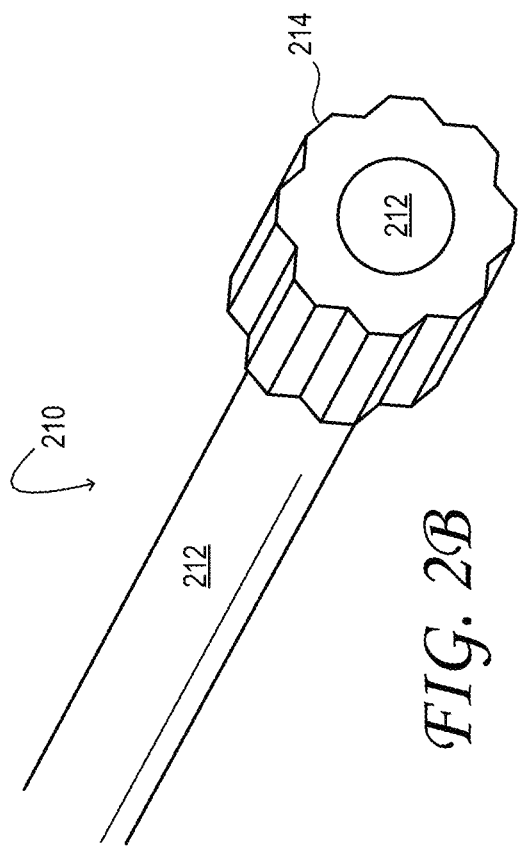

CONJOINED STEEL AND TITANIUM VIA ADDITIVE MANUFACTURE

TECHNICAL FIELD

This disclosure relates generally to the field of additive manufacture of industrial articles and, more particularly, to the field of additive manufacture of articles comprising conjoined steel and titanium.

BACKGROUND

Additive manufacture, or '3D printing' has been used to make articles of complex topologies. In this technology, a solid, real-world article is built up, layer-by-layer, based on a suitable digital model that defines the desired topology of the article. The resulting article is a high-fidelity realization of the digital model, which is obtained with minimal human intervention or dedicated tooling. When applied to the manufacture of metal-comprising articles, additive manufacture typically involves localized fusion of a consumable metal by a focused, high-energy beam. The locus of the article where material is to be added is controlled in real time by moving the article with respect to the beam and/or rastering the beam over the article. The consumable metal may be provided as a thin coating of a particulate applied over the entire article being formed or may be conducted directly to the locus, via a nozzle.

In recent years, technologies have developed that extend the scope of additive manufacture to metals of industrial significance. Nevertheless, various challenges remain. One particular challenge relates to the additive manufacture of an article comprising dissimilar conjoined metals, such as steel and titanium.

SUMMARY

Some of the examples disclosed herein relate to a process for additive manufacture of an article including conjoined first and second metals, the first metal including one of steel and titanium and the second metal including another of the steel and the titanium. The process comprises arranging an interface layer of a third metal on a substrate of the first metal, wherein the third metal is capable of forming an alloy with the first metal and capable of forming an alloy with the second metal. The process further comprises supplying a consumable form of the second metal to a locus of the interface layer and heating the locus of the interface layer in a non-reactive environment. In this process, the heating fuses the consumable form of the second metal to render a fused form of the second metal and joins the fused form of the second metal to the interface layer.

Other examples relate to an article comprising a substrate of a first metal and a printed structure of a second metal. The printed structure of the second metal is rendered by fusion of a consumable form of the second metal and concurrently joined to the substrate via a partially dissolved layer of a third metal. The first metal includes one of steel and titanium, and the second metal includes another of the steel and the titanium. In the article so formed, the third metal penetrates at least the substrate of the first metal.

Still other examples relate to a process for additive manufacture of an article including conjoined first and second metals, the first metal including one of steel and titanium and the second metal including another of the steel and the titanium. The process comprises arranging a niobium layer on a substrate of the first metal and supplying a consumable form of the second metal to a locus of the niobium layer. The process further comprises heating the locus of the niobium layer in a non-reactive environment, wherein the heating fuses the consumable form of the second metal to render a fused form of the second metal and joins the fused form of the second metal to the niobium layer.

This Summary is not intended to identify key features or essential features of the claimed subject matter. On the contrary, the scope of the claimed subject matter is limited neither to the content of this Summary nor to implementations that address any problems or disadvantages that may be noted in any part of this disclosure. The features, functions, and advantages described in this disclosure may be achieved independently in some implementations and may be combined in other implementations.

BRIEF DESCRIPTION OF THE DRAWINGS

This disclosure will be better understood from reading the following Detailed Description with reference to the attached drawing figures, wherein:

FIG. 2A shows aspects of an example manufactured product including an article comprising conjoined steel and titanium;

FIG. 2B is another view of the article from FIG. 2A;

DETAILED DESCRIPTION

Figure 1:
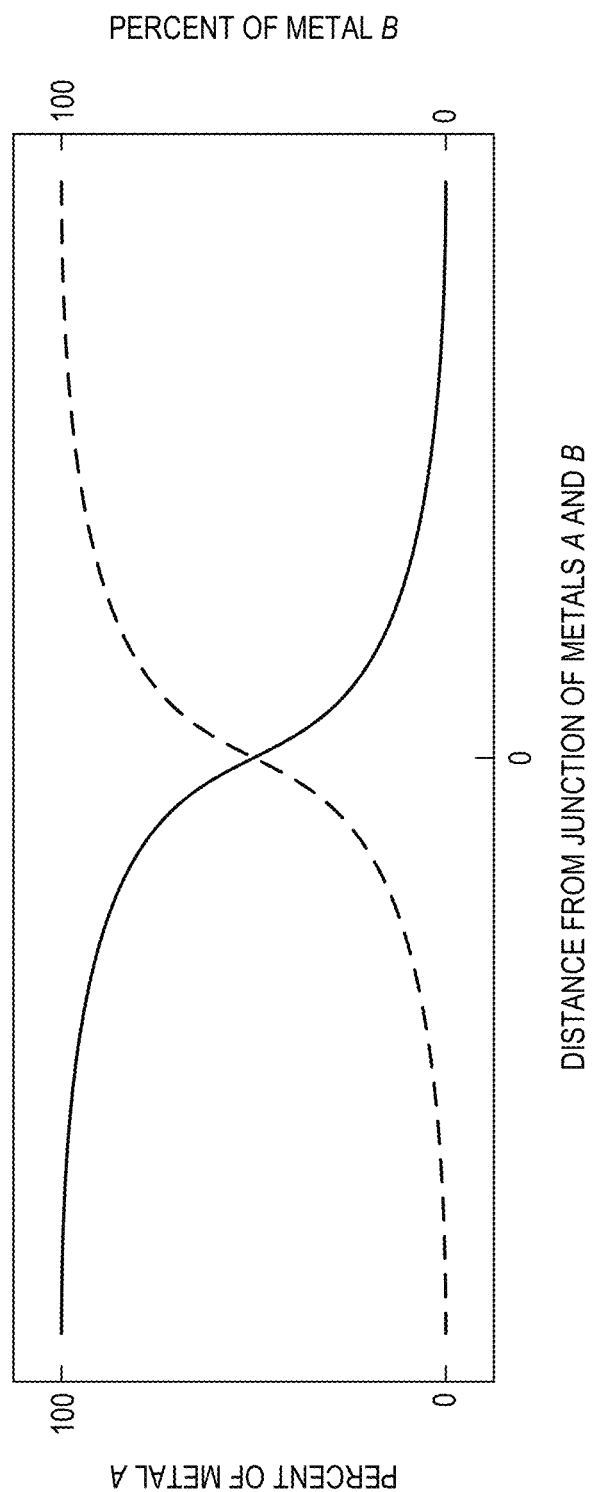
FIG. 1 is a graph showing an example desired composition across a junction of metals A and B, that form an alloy.

As noted above, state-of-the-art additive manufacture may not be suitable for articles comprising dissimilar conjoined metals. In order to provide a high-strength article, each locus of fused consumable metal must bond reliably to the layer beneath it. In scenarios in which the fused metal and the underlying layer comprise different metals, the junction between the metals should exhibit a composition gradient, wherein atoms of the fused metal have diffused into the underlying layer, and vice versa. Ideally, the junction comprises an alloy of graded composition, as illustrated in the composition-profile graph of FIG. 1.

Some combinations of dissimilar metals will not form such an alloy, however. In many instances, the lattice energies of the pure metals and of the hypothetical alloy are such that the free energy of the alloy would be greater than that of the phase-separated system. This can occur, for example, when the lattice spacings of the metals sought to be joined are very different. In other instances, the dissimilar metals may form a stable intermetallic compound of fixed composition (e.g., 1:1, 2:1, and so on), as opposed to the graded alloy composition shown in FIG. 1. Without tying this disclosure to any particular theory, it is believed that both of these effects contribute to the observed difficulty of directly joining steel and titanium via direct additive manufacture.

The inventors herein have discovered a solution to the above difficulty. In this solution, a relatively thin interface layer of a mutually compatible third metal is additively incorporated above the substrate of a first metal and below the fused form of a dissimilar, second metal. The composition of the interface layer is selected based on its ability to form a graded alloy with each of the first and second metals to be joined.

Before describing the solution in detail, one example application context for an additively manufactured article formed in this manner will be presented. FIG. 2A shows aspects of an example manufactured product 200 in the form of an aircraft. The aircraft includes, inter alia, a fuselage 202, wing sections 204, and a tail section 206 comprising a control surface 208. As shown in the cutout portion of the drawing, the control surface is actuated by a hydraulically driven, rotatable gear 210 that controls the deflection of the control surface. The gear includes a shaft 212 to which a sprocket 214 is connected. This configuration is also illustrated in FIG. 2B.

Virtually all of the structural and/or functional components of an aircraft may be optimized for mechanical strength. In addition, many of the same components are further optimized for reduced weight. To this end, sprocket 214 may comprise a steel selected for strength, hardness, and durability. Shaft 212, being of significant length, may comprise titanium or a titanium alloy selected for high strength and low weight. As most steels have a density between 7.75 and 8.05 grams per cubic centimeter (g cm$^{-1}$), whereas titanium has a density of 4.51 g cm$^{-1}$, it is a particular advantage, to incorporate titanium in components of significant size. In some implementations, it may be desirable to print sprocket 214 directly onto a previously machined titanium or titanium-alloy shaft 212, via an additive-manufacture process.

It will be understood that the examples illustrated in this disclosure in no way limit the applicability of the underlying technology. Indeed, the processes described herein may be applied to the additive manufacture of a wide range of articles comprising conjoined steel and titanium. Such articles may or may not be specifically configured in order to optimize mechanical strength relative to weight. Furthermore, it is not necessarily the case that the substrate of an additively manufactured article comprise titanium or that the printed portion comprise steel, as the opposite configuration is equally envisaged.

Figure 3:
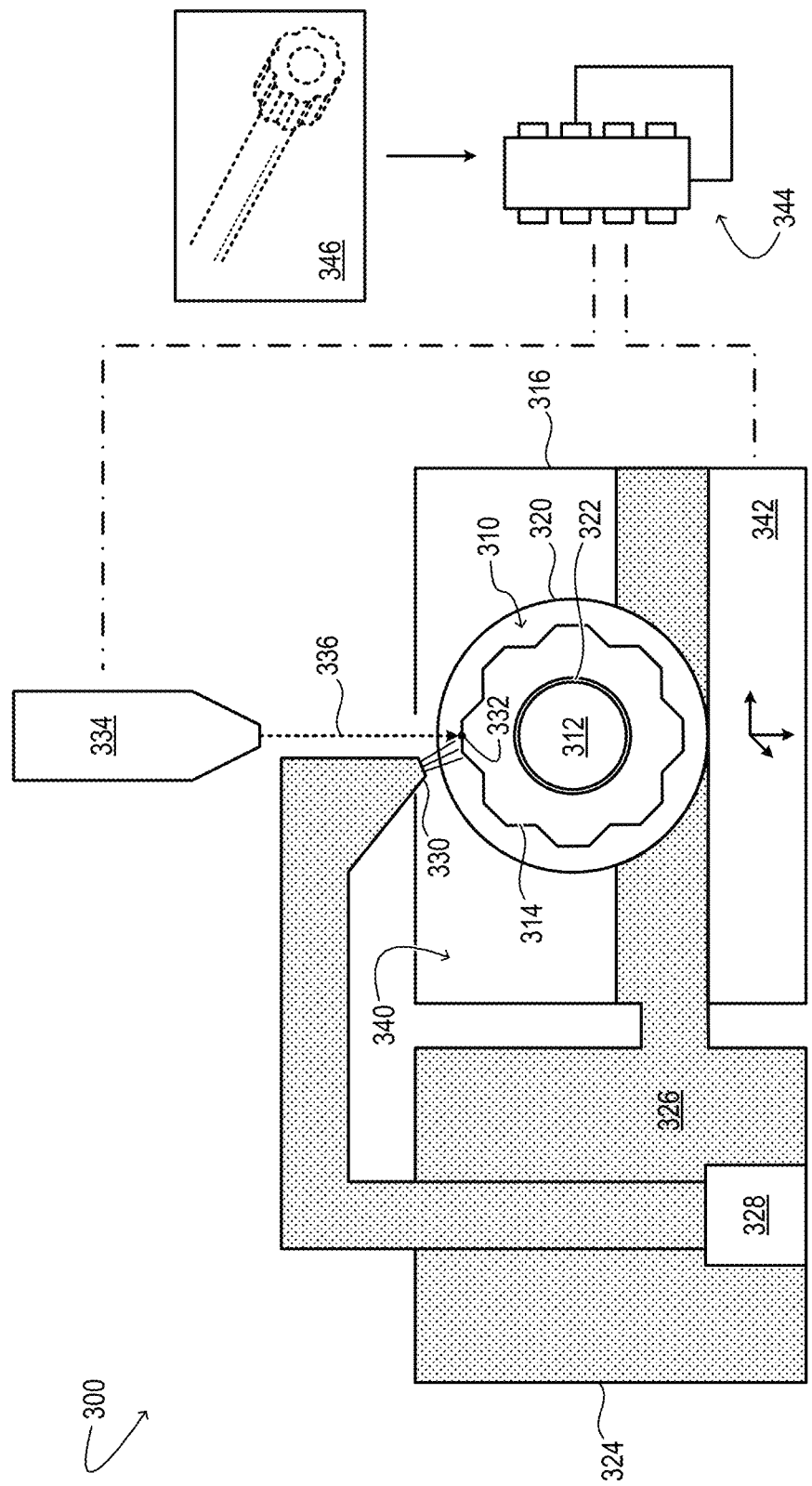
FIG. 3 shows aspects of an example apparatus configured for additive manufacture of an article from a consumable metal particulate.

FIG. 3 shows aspects of an example apparatus 300 configured for additive manufacture of an article 310. Apparatus 300 includes a chamber 316 that encloses article 310 during the additive-manufacture process. The chamber includes a rotating chuck 320 to which the article is secured during the additive-manufacture process. In the particular, nonlimiting example illustrated in FIG. 3, substrate 312 of article 310 is secured to the rotating chuck. Rotational mounting may be useful for the additive manufacture of articles having rotational symmetry, for example. In other examples, the article may be secured via a vice, clamp, or anvil.

A 'substrate', as used herein, is the base component of the article to be formed via additive manufacture. In some examples, the substrate is a component of relatively simple topology, which may be formed by conventional machining. In some examples, the substrate may comprise titanium; in other examples, the substrate may comprise steel.

Continuing in FIG. 3, an interface layer 322 comprising a thin foil of a third metal is arranged over substrate 312. In some examples, the interface layer may be pre-welded to the substrate. In other examples, the interface layer initially may be arranged on, but not firmly bonded to the substrate. In the course of additive manufacture of article 310 (vide infra), interface layer 322 may become welded to substrate 312.

In apparatus 300, article 310 is formed in layers by spatially selective addition of a fused form 314 of the second metal to the underlying layer of the article, starting with substrate 312, or, with interface layer 322 in implementations in which an interface layer is included. Accordingly, apparatus 300 includes a metal particulate reservoir 324 configured to store a supply of a consumable form of the second metal embodied as metal particulate 326. The metal particulate may comprise a coarse or fine metal powder, for example. In examples in which the substrate comprises titanium or a titanium alloy, the metal particulate may comprise steel; in examples in which the substrate comprises steel, the metal particulate may comprise titanium or a titanium alloy.

Apparatus 300 includes a metal particulate pump 328 configured to pump metal particulate 326 from metal particulate reservoir 324 and to deliver the pumped metal particulate to nozzle 330. The nozzle, in the illustrated example, is arranged over locus 332 where fused metal particulate is to be added to article 310. Other implementations may include a plurality of nozzles configured to disperse a thin layer of the metal particulate over the entire surface of the article to be formed. In any case, chamber 316 may be configured such that unfused metal particulate is returned to metal particulate reservoir 324 for later use.

Apparatus 300 includes an energy-beam source 334 configured to deliver an energy beam 336 to locus 332, in order to fuse the metal particulate at the locus and thereby add the fused metal particulate to article 310. In some implementations, the energy-beam source may include a laser, such as a pulse-modulated, high-power infrared laser. The laser may be configured to deliver a power of 1500 to 2000 watts (W) to a focal area of about four square millimeters (mm$^2$). In other implementations, an electron-beam source, plasma-arc, gas-metal arc source, or virtually any energy source of similar power and focal area may be used in lieu of the laser.

Apparatus 300 is configured to maintain a non-reactive environment 340 in chamber 316, at least during fusion of the metal particulate. The non-reactive environment may include an environment depleted of oxygen and nitrogen, for instance. In some examples, the non-reactive environment may include vacuum. In other examples, the non-reactive environment may include an atmosphere of an inert gas such as argon or helium. In some particular examples, the non-reactive environment may include nitrogen. In some examples, the inert gas may flow through chamber 316. In other examples, the atmosphere may be nominally static, to avoid excessive cooling of the fused metal particulate.

Apparatus 300 includes a translational stage 342 mechanically coupled to rotating chuck 320. As articles are formed layer-by-layer in apparatus 300, the translational stage may be configured to gradually lower the height of the rotating chuck as successive layers of the article are built up. The translational stage may also be configured to move the rotating chuck laterally to controllably vary the relative position of locus 332 relative to the frame of reference of the rotating chuck, and accordingly, of article 310. The translational stage may include two or more component translational stages (e.g., linear actuators) configured to move the chuck in two or more corresponding directions, which may include Cartesian X, Y, and Z axes, for instance. In some examples, one or more component rotational stages may be used in lieu of, or in addition to the one or more component translational stages. In other examples equally consonant with this disclosure, a translational or rotational stage may be coupled mechanically to energy-beam source 334 and or nozzle 330, and rotating chuck 320 may be stationary. In still other examples, the rotating chuck as well as the energy-beam source and/or nozzle may be movable. When applied to an energy-beam source in the form of a laser, a rotational stage may include a mirror having a controlled deflection and thereby configured to reflect the focused laser beam to any desired locus 332.

Apparatus 300 includes a computer 344. Computer 344 is operatively coupled to translational stage 342 and configured to control in real time the relative position of locus 332 relative to the frame of reference of rotating chuck 320 via a series of actuator-control signals. In addition, the computer is operatively coupled to energy-beam source 334 and configured to control in real time, via one or more energy-beam control signals, the power delivered to the locus. Computer 344 is further configured to receive a digital model 346 that represents the topology of the article to be formed. The nature and/or digital data structure of the digital model is not particularly limited. The digital model may include a CAD file in some examples. The computer is configured to vary the actuator- and energy-beam control-signal outputs based on the digital model, so as to achieve additive manufacture of the article as defined by the digital model.

Figure 4:
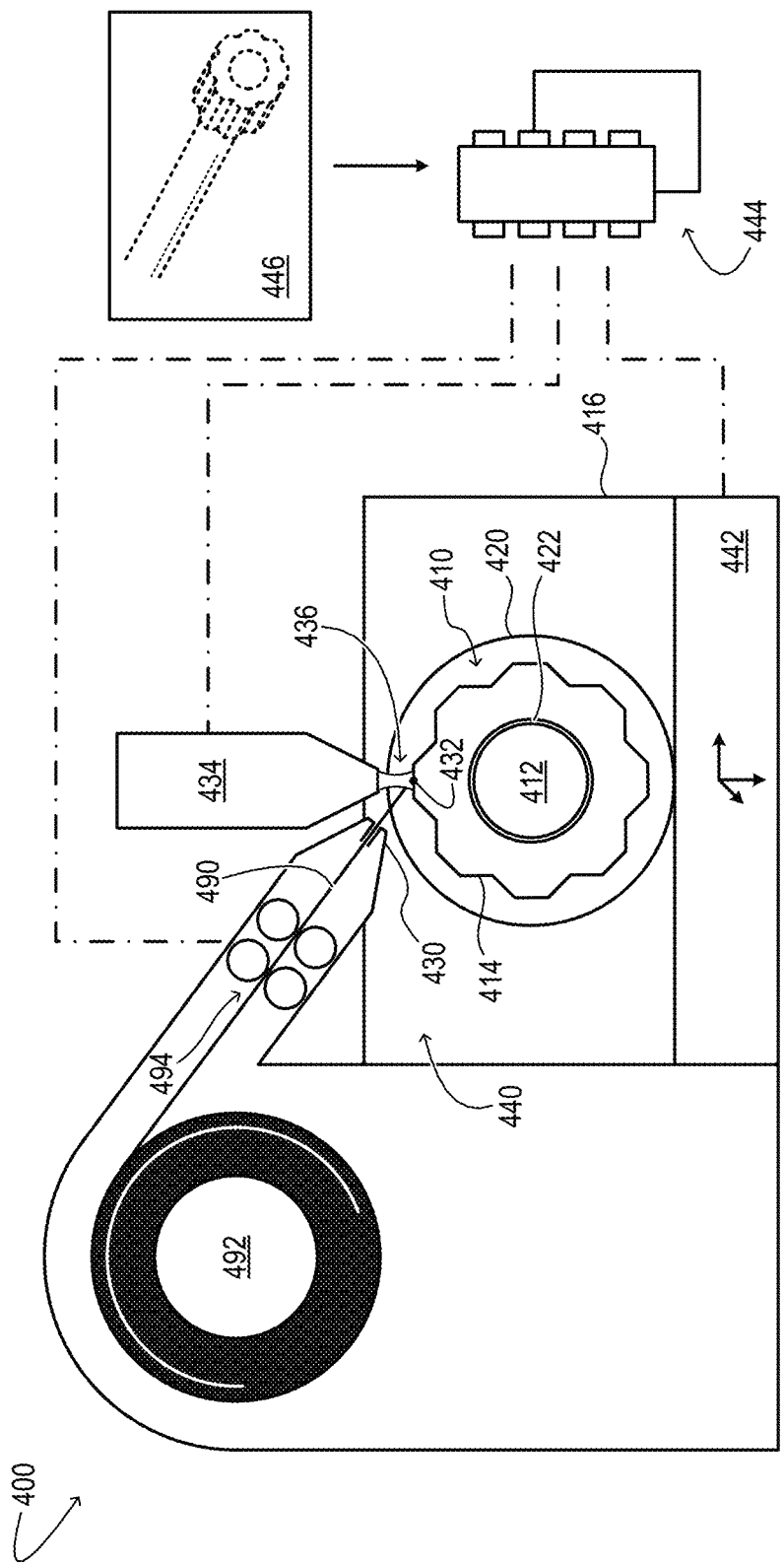
FIG. 4 shows aspects of an example apparatus configured for additive manufacture of an article from a consumable metal wire.

No aspect of apparatus 300 should be construed in a limiting sense, because various other additive-manufacture apparatuses may be used alternatively. FIG. 4 shows another apparatus 400 configured for additive manufacture of an article 410. In apparatus 400, chamber 416 encloses the article, which is secured to rotating chuck 420. As noted in the previous configuration, interface layer 422 comprises a thin foil of a third metal arranged over substrate 412.

In apparatus 400, article 410 is formed in layers by spatially selective addition of a fused form 414 of the second metal to the underlying layer of the article, starting with substrate 412, or, with interface layer 422 in implementations in which an interface layer is included. Accordingly, apparatus 400 includes a metal-wire spool 492 configured to store a supply of a consumable form of the second metal embodied as metal wire 490. The metal wire may comprise wire of any shape, dimension, and/or gauge—e.g., 14, 16, 18, or 20 gauge, for example. In examples in which the substrate comprises titanium or a titanium alloy, the metal wire may comprise steel; in examples in which the substrate comprises steel, the metal wire may comprise titanium or a titanium alloy.

Apparatus 400 includes a wire feeder 494 configured to conduct metal wire 490 from metal-wire spool 492 and to deliver the metal wire to nozzle 430. The nozzle, in the illustrated example, is arranged adjacent to locus 432, where the fused form of the metal wire is to be added to article 410.

In apparatus 400, energy-beam source 434 takes the form of an electron-beam emitter, which emits electron beam 436. The electron-beam emitter may be configured to deliver a power of 1500 to 2000 watts (W) to an area of about one to five square millimeters ($mm^2$), in some examples. In still other implementations, a laser, plasma-arc, gas-metal arc source, or virtually any energy source may be used in lieu of the electron-beam emitter.

As in the previous configuration, apparatus 400 is configured to maintain a non-reactive environment 440 in chamber 416, at least during fusion of metal wire 490. The non-reactive environment may include vacuum, or, in some examples, an atmosphere of an inert gas such as argon or helium. In implementations in which the non-reactive environment is an evacuated environment, energy-beam source 434 may include an electrically heated filament configured to promote thermionic emission of electrons. In implementations in which the non-reactive environment comprises an inert gas, electron emission may be facilitated by ionization of the inert gas. In these and other implementations, energy-beam source 434 may be biased at a negative voltage while rotating chuck 420, substrate 412, and article 410 are maintained at ground potential. In this manner, electrons from the energy-beam source are accelerated toward locus 432 of the article, where material deposition is desired.

In apparatus 400, metal-wire feeder 494 feeds metal wire 490 directly into electron beam 436 or into locus 432, which is heated by the electron beam. In this example, energy-beam source 434 comprises a refractory metal, such as tungsten, which is not intended to be consumed in the additive-manufacture process. In other examples, the energy-beam source may take the form of a plasma arc or gas-metal arc. In some variants, the consumable metal wire itself may be part of the heating circuit, may carry an electric current, and may be biased at a different voltage than article 410.

As in the previous configuration, apparatus 400 includes a translational stage 442 mechanically coupled to rotating chuck 420. In other examples equally consonant with this disclosure, a translational or rotational stage may be coupled mechanically to energy-beam source 434 and or nozzle 430, and rotating chuck 420 may be stationary. In still other examples, the rotating chuck as well as the energy-beam source and/or nozzle may be movable.

In apparatus 400, computer 444 is operatively coupled to translational stage 442, energy-beam source 434, and metal-wire feeder 494. The computer is configured to receive a digital model 446 of the article to be formed, as described above.

Figure 5:
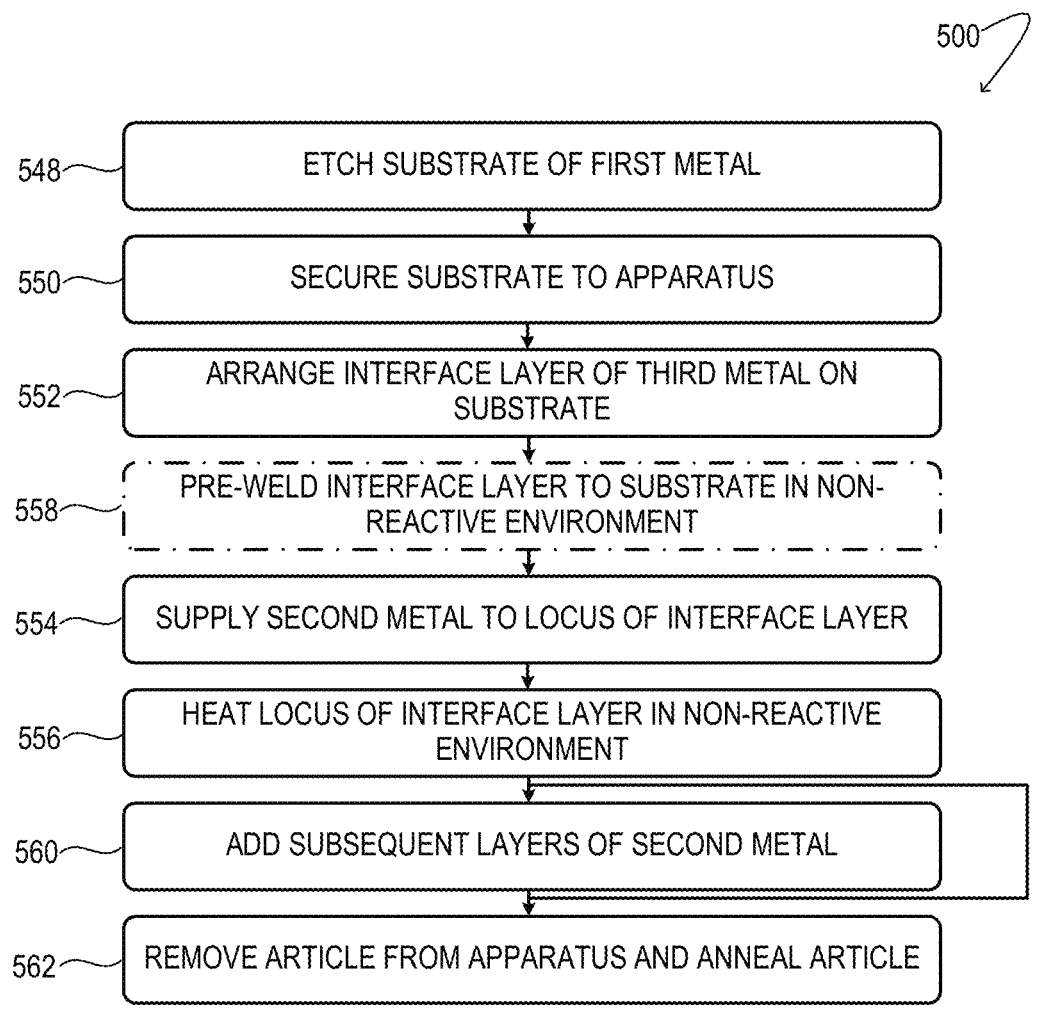
FIG. 5 illustrates aspects of an example process for additive manufacture of an article comprising conjoined first and second metals.

FIG. 5 illustrates aspects of an example process 500 for additive manufacture of an article comprising conjoined first and second metals, the first metal including one of steel and titanium and the second metal including another of the steel and the titanium. In some examples, the 'steel' referenced herein may include a carbon steel. In other examples, the steel may include an alloy steel. One non-limiting example of an alloy steel that may be used in process 500 is Maraging M300 steel, which comprises, by mass, 67% iron, 18.5% nickel, 9% cobalt, 4.8% molybdenum, 0.6% titanium, 0.1% aluminum, 0.10% silicon, 0.10% manganese, 0.030% carbon, 0.01% zirconium, 0.01% sulfur, and 0.0030% boron. Likewise, the 'titanium' referenced herein may include substantially pure titanium or any suitable titanium alloy. One non-limiting example of a titanium alloy that may be used in process 500 is Ti-6AL-4V, which comprises, by mass, about 6% aluminum and 4% vanadium.

Process 500 may be implemented using apparatus 300 of FIG. 3, which is described hereinabove. It will be understood, however, that process 500 may implemented using any other suitable apparatus, which, in some implementations, may differ significantly from apparatus 300.

At 548 of process 500, a substrate of a first metal, steel or titanium, is etched in order to facilitate additive manufacture of an article. The etching may include chemical etching, electrochemical etching, mechanical etching (e.g., abrasion, such as sanding), or any desired combination of the above. Etching may be used to prime the exterior surface of the substrate and thereby enhance adhesion of additional metals to the substrate. At 550 the substrate is secured to an additive-manufacture apparatus. The substrate may be secured via a chuck, vice, clamp, or anvil, for instance.

At 552 an interface (or so-called 'buttering') layer of a third metal is arranged on the substrate of the first metal. The third metal may be any metal capable of forming an alloy with the first metal and capable of forming an alloy with the second metal. In some examples, the third metal may exhibit a lattice spacing intermediate between the lattice spacing of steel and the lattice spacing of titanium. Typically, the third metal does not form an intermetallic compound with either steel or titanium. In some examples, the interface layer may comprise one or more of vanadium, niobium, and tantalum. In some examples, the interface layer may include a foil. For instance, a niobium foil of about 0.01 to 0.10 inch in thickness may be used as the interface layer.

At 554 a consumable form of the second metal is supplied to a locus of the interface layer. In examples in which the substrate comprises titanium or a titanium alloy, the consumable form of the second metal may comprise steel; in examples in which the substrate comprises steel, the consumable form of the second metal may comprise titanium or a titanium alloy. In some examples, the consumable form of the second metal may comprise a metal particulate. The metal particulate may be supplied selectively, in some implementations, to the locus of the interface layer where the second metal is to be added. In other implementations, the metal particulate may be supplied in a thin layer over the entire interface layer. In other examples, the consumable form of the second metal may comprise a metal wire, as described above.

At 556 a locus of the interface layer is heated in a non-reactive environment of the additive-manufacture apparatus. As noted above, the non-reactive environment is an environment depleted of oxygen and nitrogen. The non-reactive environment may include vacuum or an atmosphere of static or flowing argon or helium, in some examples. The locus of the interface layer may be heated using a laser beam—e.g., the beam of a laser that delivers about 1500 to about 2000 watts to the focal area. In other implementations, the locus may be heated via an electron beam of similar power and focal area.

The heating enacted at 556 may fuse the consumable form of the second metal to render a fused form of the second metal and may join the fused form of the second metal to the interface layer. The fused form of the second metal may comprise a fused metal particulate or fused metal wire, for instance. In this manner, the heating may cause dissolution of a portion of the interface layer into the fused form of the second metal. Likewise, the heating may cause dissolution of a portion of the fused form of the second metal into the interface layer. It will be noted that the terms 'fuse', 'fused', 'fusion', and the like, may refer to local melting of the consumable form of the second metal (i.e., transition into the liquid state), in some implementations. In other implementations, the same terms may refer to a softening or sintering action that does not form a liquid per se but nevertheless promotes mass transport from one metal layer to another.

In some implementations, the heating enacted at 556 may serve also to join the interface layer to the substrate and thereby cause dissolution into the substrate of a portion of the interface layer and/or dissolution of a portion of the substrate into the interface layer. This feature is useful because it simplifies the additive-manufacture process. Nevertheless, concurrent joining of the substrate, the interface layer, and the fused form of the second metal is not always necessary or desirable. In other examples, therefore, the interface layer may be joined to the substrate prior to addition of the fused form of the second metal.

Accordingly, at optional step 558, the interface layer may be pre-welded to the substrate in the non-reactive environment of the additive-manufacture apparatus. This optional step may be enacted prior to supplying the consumable form of the second metal to the locus. In implementations that include step 558, the pre-welding may cause dissolution into the substrate of a portion of the interface layer. Likewise, the pre-welding may cause dissolution of a portion of the substrate into the interface layer.

At 560 subsequent layers of the fused form of the second metal are added to the fused layer of the second metal already formed. This step may be repeated any number of times, based on the article topology as defined in the digital model, until the desired article has been built up.

At 562 the article is removed from the additive-manufacture apparatus and annealed under controlled-temperature conditions for an appropriate period of time. Annealing may serve to reduce the density of defect sites in the additively manufactured article and thereby increase the strength of the article. The annealing process may also reduce residual stresses imparted to the article due to the joining of dissimilar metals.

Figure 6:
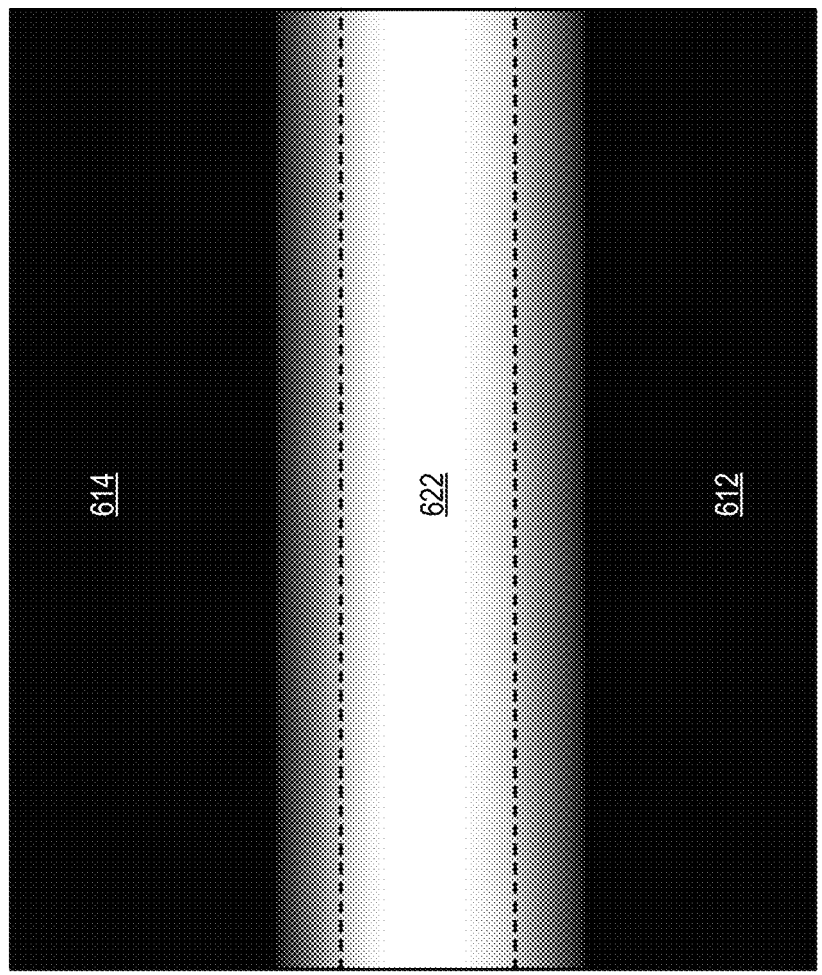
FIG. 6 shows aspects of an example article that may be formed according to the process of FIG. 5.

FIG. 6 shows aspects of an example article 610 that may be formed according to process 500 of FIG. 5. Article 610 includes a substrate 612 of a first metal conjoined to a printed structure 614 of a second metal. As noted above, the first metal may include one of steel and titanium, and the second metal may include another of the steel and the titanium. The printed structure of the second metal is formed by fusion of a consumable form of the second metal and concurrently joined to the substrate via a partially dissolved layer of a third metal 622. The third metal may include any metal capable of forming an alloy with the first metal and capable of forming an alloy with the second metal. In some examples, the third metal may exhibit a lattice spacing intermediate between the lattice spacing of steel and the lattice spacing of titanium. In some examples, the third metal does not form a stable intermetallic compound with either steel or titanium. In some examples, the third metal may include one or more of vanadium, niobium, and tantalum.

As shown in FIG. 6, third metal 622 penetrates at least the substrate 612. In some examples, the third metal also may penetrate the printed structure 614. Likewise, both the first metal from the substrate and the second metal from the fused metal particulate may penetrate into the boundary layer of the third metal. In some examples, the substrate may comprise a gear shaft, and the printed structure may comprise a sprocket.

No aspect of the process of FIG. 5, nor of the article of FIG. 6, should be interpreted in a limiting sense, because numerous variations, extensions, and omissions are also envisaged. For example, an object employed as a substrate in the additive-manufacture process of FIG. 5 may itself be a product of previous additive manufacture. In some examples, such an object may comprise a single metal. In other examples, the object may comprise dissimilar metals conjoined via an interface layer, as described herein. Accordingly, every portion of the article formed according to the process of FIG. 5 may derive, in some examples, from additive manufacture.

FIGS. 6 through 9 present analytical data collected on an article that was additively manufactured according to the process of FIG. 5. More specifically, the article was formed by additive addition of Maraging M300 alloy steel metal particulate onto a 'buttered' Ti 6AL-4V substrate. The interface layer applied to the substrate was a niobium foil 0.012 inch in thickness. The niobium foil was pre-welded to the substrate (step 558 in FIG. 5) using an additive-manufacture apparatus analogous to apparatus 300 of FIG. 3, with metal particulate delivery suspended during the pre-welding. A laser irradiance of 1500 W focused to a spot size of about 4 mm$^2$ and translated over a 1.0-inch line length at a rate of 39.4 inches per minute, under an argon flow of 120 liters per minute (L/M). A single pass along this line was used for the pre-welding.

Subsequent to the pre-welding, the laser power was increased to 1800 W, and Maraging M300 alloy steel metal particulate was delivered at a flow rate of 25 grams per minute. The laser spot was translated twice over the same 1.0-inch line length at a rate of 39.4 inches per minute, also under an argon flow of 120 L/M.

The article formed in this manner was cleaved using a diamond saw in a plane parallel to the direction of material addition and parallel also to the direction of travel of the laser spot. The cleaved surface was sealed in Bakelite, ground using 320 grit sandpaper, and polished using diamond paste. All of the analysis reported herein was conducted on the polished, cleaved surface.

Figure 7:
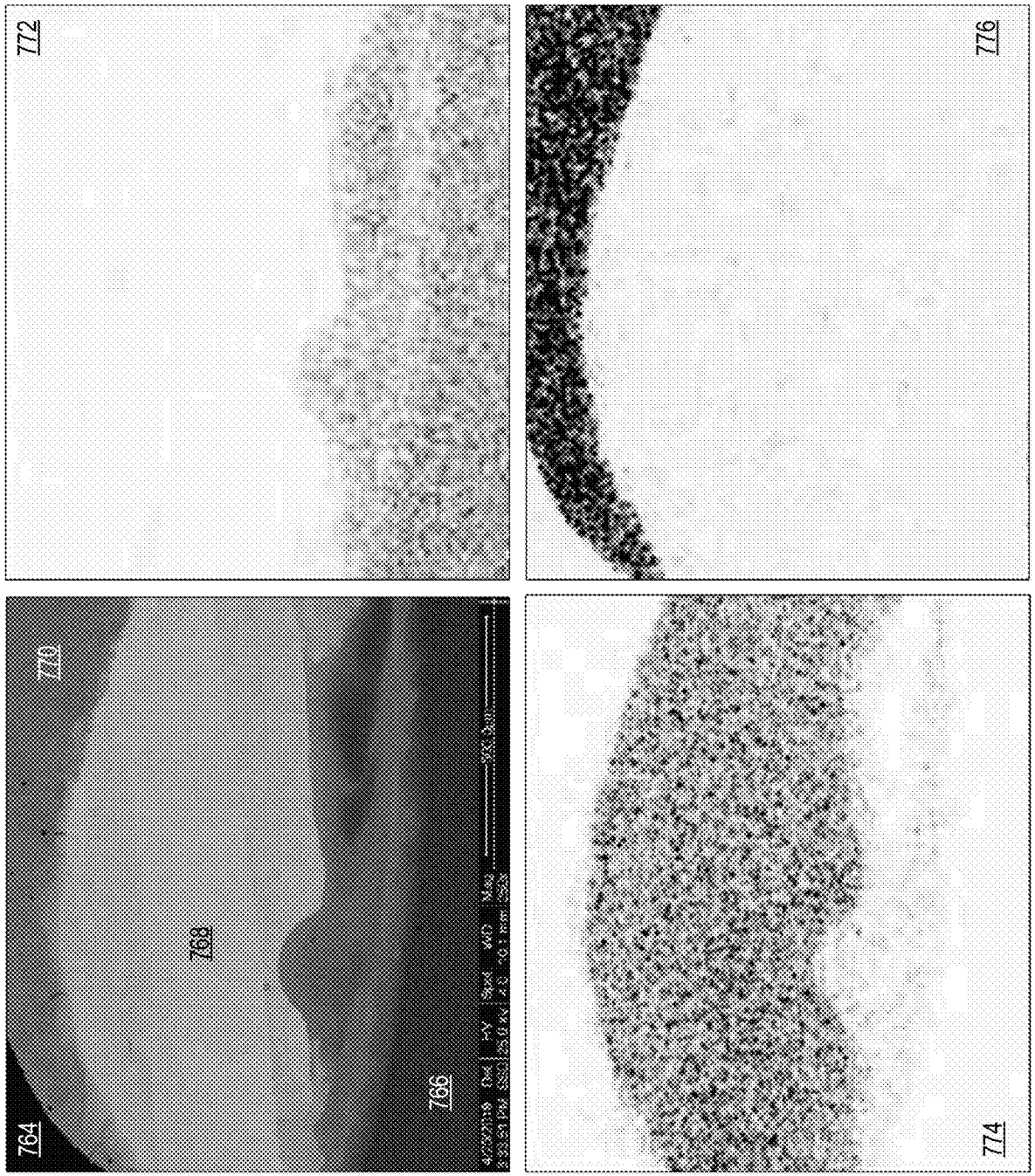
FIG. 7 shows a series of energy-dispersive x-ray (EDX) emission images of a region of a cleaved surface of an example article formed according to the process of FIG. 5.

FIG. 7 shows a series of images of the same region of the cleaved surface. Image 764 is a high-magnification optical microscopy image provided for reference; it shows titanium layer 766, niobium layer 768, and steel layer 770. The other images in FIG. 7 are energy-dispersive x-ray (EDX) emission maps recorded over the same region of the cleaved surface during exposure to Mo Kα radiation. In image 772, the brightness at each pixel corresponds to the Ti Kα emission intensity, reporting, therefore, on the relative concentration of titanium atoms at the cleaved surface. Likewise, the brightness in image 774 corresponds to the Nb Lα emission intensity and reports on the niobium concentration, while the brightness in image 776 corresponds to the Fe Kα emission intensity and reports on the iron concentration. These results demonstrate significant penetration of niobium into titanium layer 766 and steel layer 770. This feature is more easily seen with reference to the EDX line-scan data of FIG. 8.

Figure 8:
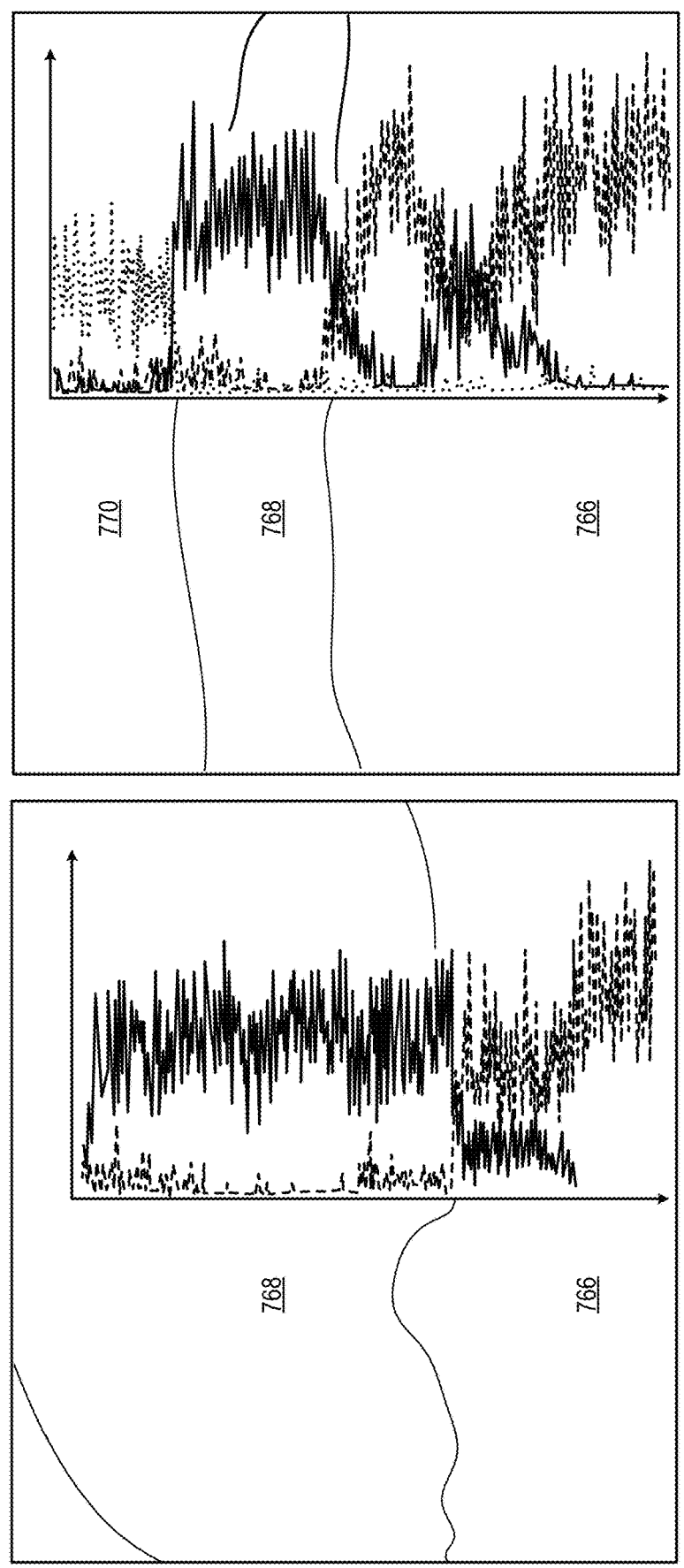
FIG. 8 shows EDX line-scan data extracted along two paths extending through the region shown in FIG. 7.

FIG. 8 presents EDX line data extracted along two paths extending through the region imaged in FIG. 7. The paths are substantially parallel to the direction of material addition and offset with respect to each other by several millimeters. In these graphs, the solid line corresponds to the Nb Lα emission intensity, the dashed line corresponds to the Ti Kα emission intensity, and the dotted line corresponds to the Fe Kα emission intensity. As noted above, niobium appreciably penetrates both titanium layer 766 and steel layer 770.

Figure 9:
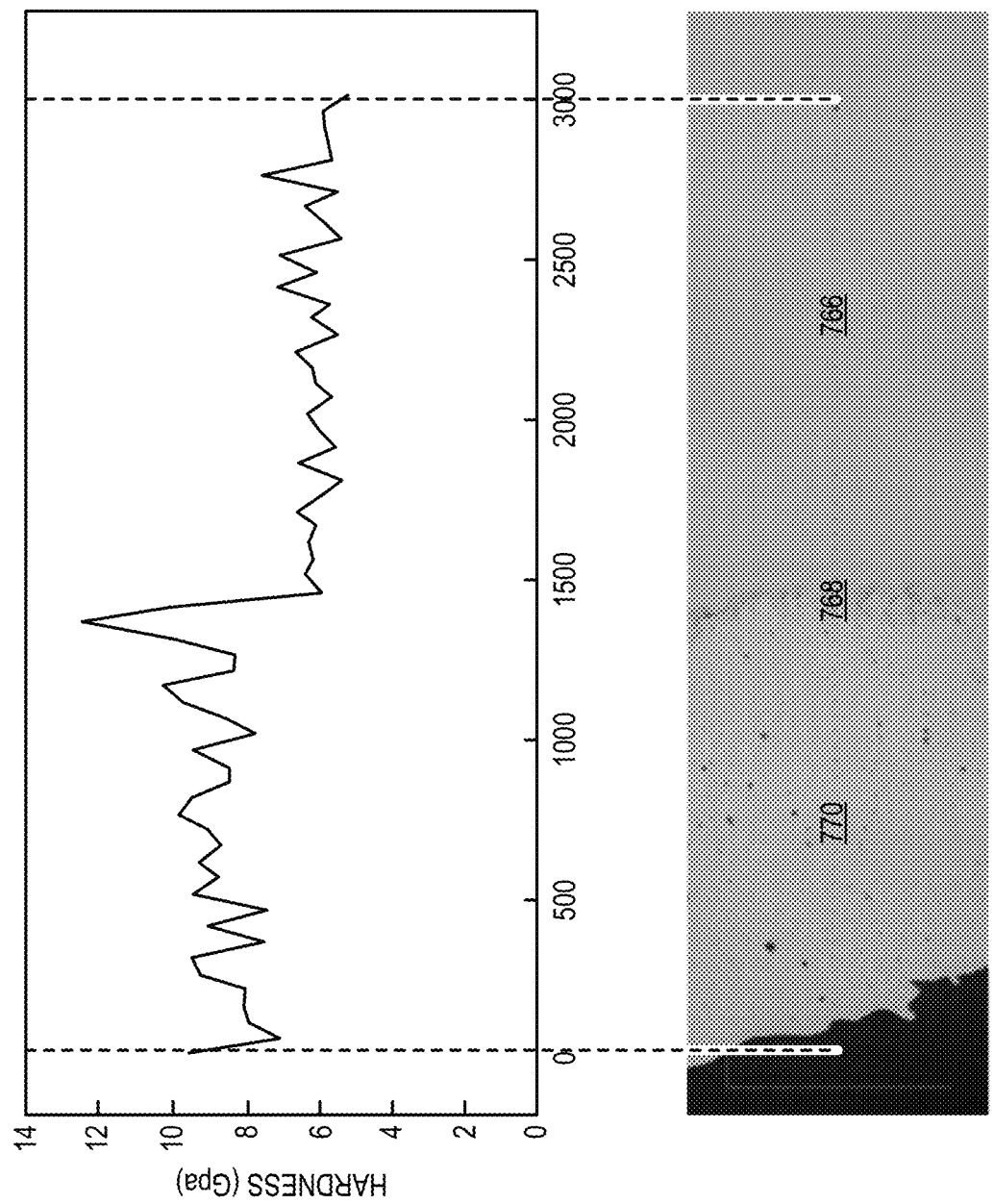
FIG. 9 shows the result of a nanoindentation line-scan experiment conducted on another region of the cleaved surface of the article formed according to the process of FIG. 5.

FIG. 9 presents the result of a nanoindentation line-scan experiment conducted on another region of the cleaved surface, also along a path substantially parallel to the direction of material addition. For this study, an MTS nanoindenter was operated in the CSM test mode with an indentation depth set to 700 nanometers and an indentation spacing set to 50 micrometers. The data show a relatively graded transition from the pure titanium phase 766 to the pure steel phase 770.

Figure 10:
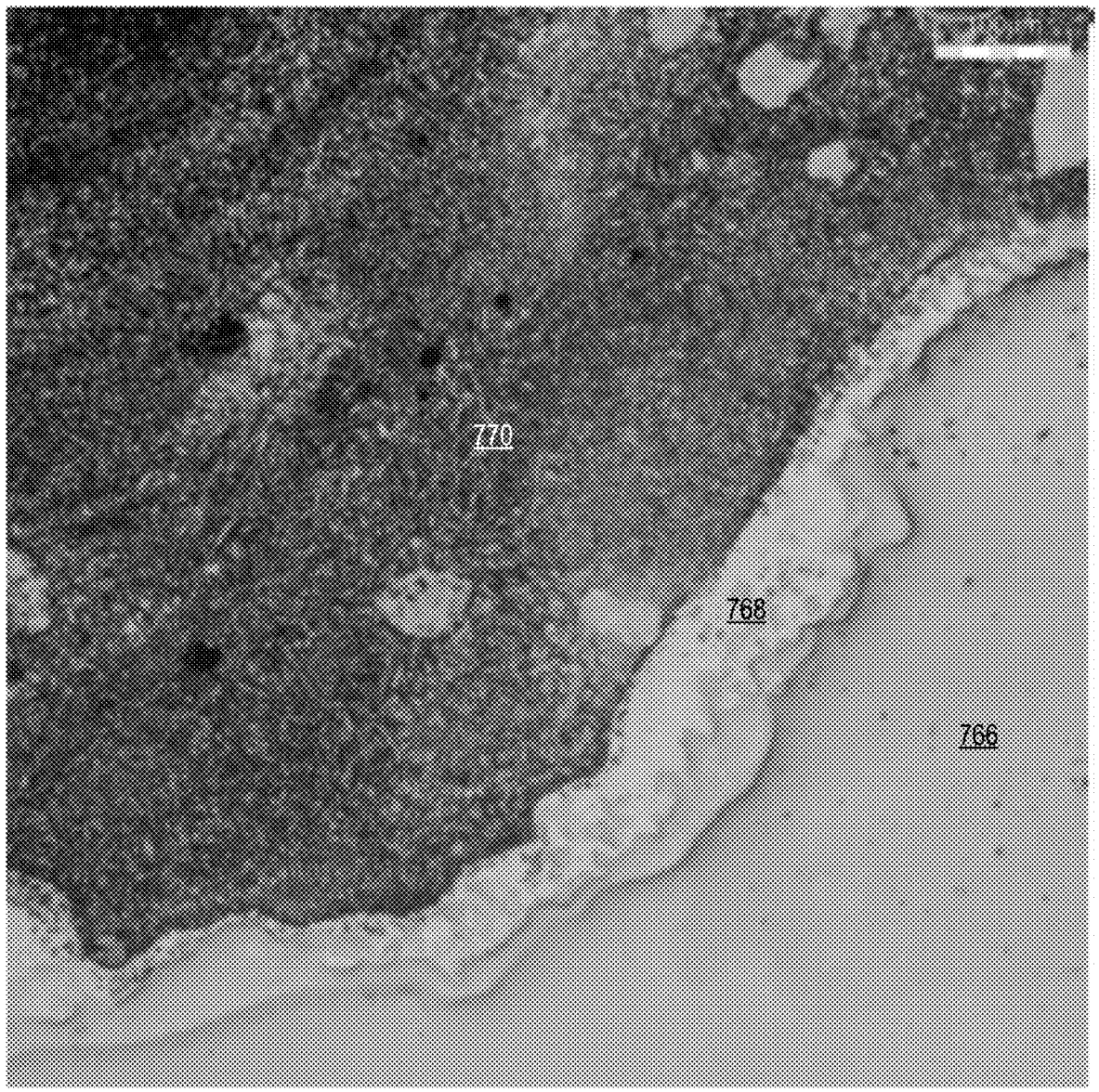
FIG. 10 shows a scanning electron microscopy (SEM) image of another region of the cleaved surface of the article formed according to the process of FIG. 5.

FIG. 10 is a scanning electron microscopy (SEM) image of another portion of the cleaved surface of the examined in FIGS. 6, 7 and 8. Prior to examination by SEM, the cleaved surface was chemically etched using Kroll's reagent. In addition to revealing the grain morphology of steel layer 770, the SEM image shows significant disruption of the initially smooth niobium layer 768, which is consistent with significant mass transport of niobium into titanium layer 766 and steel layer 770.

Additional articles were prepared according to the process of FIG. 5, using somewhat different conditions. These articles also were analyzed via electron microscopy, EDX spectroscopy, and nanoindentation, as described above. An article prepared as described above, but using a higher laser power of 2000 W for pre-welding and a lower laser power of 1200 W for particulate fusion, resulted in a more heterogeneous junction between the steel and titanium layers, relative to the results shown in FIG. 10. EDX analysis of that article revealed significant penetration of niobium into the titanium layer and into the steel layer. Another article prepared as described above, using a laser power 1500 W for pre-welding and for particulate fusion and a thinner niobium foil of 0.007 inch, revealed less intermixing of the metals at the junction. In particular, EDX analysis of that article revealed significant penetration of niobium into the titanium layer, but little or no penetration of niobium into the steel layer.

This disclosure is presented by way of example and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or processes described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A process for additive manufacture of an article including conjoined first and second metals, the first metal including one of steel and titanium and the second metal including another of the steel and the titanium, the process comprising:

arranging an interface layer comprising a foil of a third metal on a substrate of the first metal, wherein the third metal is capable of forming an alloy with the first metal and capable of forming an alloy with the second metal, wherein the interface layer comprises one or more of vanadium, niobium, or tantalum;

heating the interface layer with an energy beam to join the interface layer to the substrate;

supplying a consumable form of the second metal to a locus of the interface layer, wherein the locus of the interface layer is at a location where the interface layer is not bonded to the substrate; and heating the locus of the interface layer with the energy beam in an non-reactive environment, wherein the heating contemporaneously: (1) fuses the consumable form of the second metal to render a fused form of the second metal, (2) joins the fused form of the second metal to the interface layer, and (3) joins the interface layer to the substrate.

2. The process of claim 1, wherein heating the locus of the interface layer causes dissolution of a portion of the interface layer into the fused form of the second metal.

3. The process of claim 1, wherein heating the locus of the interface layer causes dissolution into the substrate of a portion of the interface layer.

4. The process of claim 1 wherein the non-reactive environment includes an environment of flowing argon.

5. The process of claim 1 wherein heating the locus of the interface layer comprises heating with a laser beam.

6. The process of claim 5 wherein the laser beam delivers 1.5 to 2.0 kilowatts to a focus of the laser beam.

7. The process of claim 1 wherein heating the locus of the interface layer comprises heating with an electron beam.

8. The process of claim 1 wherein the steel includes an alloy steel, and wherein the titanium includes about 6% aluminum and 4% vanadium by mass.

9. The process of claim 1 wherein the consumable form of the second metal includes a particulate, and wherein the fused form of the second metal includes a fused particulate.

10. The process of claim 1 wherein the consumable form of the second metal includes a wire.

11. The process of claim 1 further comprising annealing the article.

12. A process for additive manufacture of an article including conjoined first and second metals, the first metal including one of steel and titanium and the second metal including another of the steel and the titanium, the process comprising:

arranging a niobium layer comprising a niobium foil on a substrate of the first metal;

heating the niobium layer with an energy beam to join the niobium layer to the substrate;

supplying a consumable form of the second metal to a locus of the niobium layer, wherein the locus of the niobium layer is at a location where the niobium layer is not bonded to the substrate; and heating the locus of the niobium layer with the energy beam in an non-reactive environment, wherein the heating contemporaneously: (1) fuses the consumable form of the second metal to render a fused form of the second metal, (2) joins the fused form of the second metal to the niobium layer, and (3) joins the niobium layer to the substrate.

13. The process of claim 12 wherein heating the locus of the niobium layer causes dissolution of a portion of the niobium layer into the fused form of the second metal.

14. The process of claim 12 wherein heating the locus of the niobium layer causes dissolution into the substrate of a portion of the niobium layer.

15. The process of claim 12 wherein heating the locus of the niobium layer comprises heating with one or more of a laser beam and an electron beam.

16. The process of claim 12 wherein the consumable form of the second metal includes a particulate, and wherein the fused form of the second metal includes a fused particulate.

17. The process of claim 12 wherein the consumable form of the second metal includes a wire.

18. The process of claim 12 wherein the niobium foil has a thickness in the range of 0.01 to 0.10 inch.

19. The process of claim 12 wherein the non-reactive environment comprises argon.

20. The process of claim 12 wherein heating the niobium layer with the energy beam comprises heating the niobium layer with an energy beam having a power of at least 1500 W.

21. The process of claim 12, wherein the steel includes an alloy steel, and wherein the titanium includes about 6% aluminum and 4% vanadium by mass.

22. The process of claim 12, further comprising annealing the article.

23. The process of claim 1, wherein the additive manufacture of the article comprises printing a second component comprising the second metal onto a first component comprising the first metal.

24. The process of claim 1, wherein heating the locus of the interface layer comprises heating with an arc.

25. The process of claim 12, wherein the additive manufacture of the article comprises printing a second component comprising the second metal onto a first component comprising the first metal.

26. The process of claim 12, wherein heating the locus of the interface layer comprises heating with an arc.

* * * * *